United States Patent [19]

Rohrs et al.

[11] Patent Number: 4,918,727
[45] Date of Patent: Apr. 17, 1990

[54] DOUBLE TALK DETECTOR FOR ECHO CANCELLER AND METHOD

[75] Inventors: Charles E. Rohrs; Richard C. Younce, both of South Bend, Ind.

[73] Assignee: Tellabs Incorporated, Lisle, Ill.

[21] Appl. No.: 204,247

[22] Filed: Jun. 9, 1988

[51] Int. Cl.4 ............................................. H04B 3/23
[52] U.S. Cl. .................................... 379/410; 370/32.1
[58] Field of Search ............... 379/410, 411, 406, 409, 379/407; 370/32, 32.1

[56] References Cited

U.S. PATENT DOCUMENTS 4,360,712 11/1982 Horna ............................ 379/410 X
4,679,230 7/1987 Lassaux et al. ...................... 379/411
4,782,525 11/1988 Sylvain et al. ........................ 379/410

*Primary Examiner*—Jin F. Ng
*Assistant Examiner*—Randall S. Vaas
*Attorney, Agent, or Firm*—Juettner Pyle Lloyd & Verbeck

[57] ABSTRACT

A double talk detector for echo cancellers monitors the ratio of four wire transmit in energy to transmit out energy (ERLE), along with the change and direction of change of an estimated impulse response, to control updating of the estimated impulse response. When the ERLE is low and the directional change of the impulse response is high, indicating an end path switch, the double talk detector enables the estimated impulse response to be updated. If the directional change of the impulse response and the ERLE are both low, indicating the occurrence of double talk, the detector inhibits updating of the impulse response until either the ERLE becomes sufficiently high, indicating single talk, or the directional change of the impulse response becomes sufficiently large, indicating an inconverged state of the canceller. The arrangement allows convergence of the echo canceller to be properly controlled both in response to double talk and to changes in the impulse response of the end path.

52 Claims, 3 Drawing Sheets

DOUBLE TALK DETECTOR FOR ECHO CANCELLER AND METHOD

BACKGROUND OF THE INVENTION

The invention relates to an improved double talk detector for controlling convergence of an echo canceller, and to a method of controlling convergence of an echo canceller.

In a telephone network, four wire (4W) and two wire (2W) segments are joined at opposite ends of the network bu hybrid circuits, often called 4:2 hybrids. Impedance mismatch in a hybrid circuit causes a 4W receive signal to be reflected back onto the 4W transmit path. If there is enough delay in the network, this reflected signal presents itself as echo to the speaker who originated it at the far end. Adaptive echo cancellers remove the echo signal from the 4W transmit path.

Normally, a 4W receive signal is at a higher level than its echo signal on the 4W transmit path, since there is loss across the hybrid circuit. Near end speech on the trransmit path will therefore typically be stronger than the echo signal. Such near end speech is unwanted noise as far as convergence of the echo canceller is concerned, since it will diverge the canceller if the canceller were to continue updating its estimated impulse response while near end speech is present. Consequently, a critical component of an echo canceller is a near end speech detector, or double talk detector, to inhibit updating of the estimated impulse response while near end speech is present. To detect near end speech on the 4W transmit path, it is not sufficient to simply look for energy on the path, since it will be there from echo even when there is no near end speech. Various techniques have therefore been developed to detect near end speech and inhibit updating of the canceller when it is present.

A performance measure that represents the effectiveness of the cancellation process, such as echo return loss enhacement (ERLE), can be used to detect double talk. In single talk, when there is only far end speech, an adaptive filter of the canceller can cancel most of the energy on the 4W transmit in path, leaving little residual echo on the 4W transmit out path. Thus, when only far end speech is present, the ratio of the 4W transmit in energy to 4W transmit out energy, i.e., the ERLE, is high and much greater than one. When near end speech is present, however, the adaptive filter can cancel only a small portion of the 4W transmit in energy, allowing the near end speech to pass as residual energy. Under this condition, the ERLE is low and approaches one. The double talk detector can then simply monitor the ERLE, and when the ERLE is high, allow the taps or estimated impulse response to update to converge the adaptive filter. Should the ERLE begin to decrease, then the taps are frozen to prevent divergence of the filter.

The double talk detection method of measuring the ERLE provides satisfactory convergence control in a nonswitched environment, but suffers from a fundamental limitation in a switched environment where the end path of the telephone network may change from one call to the next. An echo canceller's ability to remove echo from a 4W transmit path depends upon it being able to generate an accurate model of the end path impulse response. When the end path changes, the canceller can no longer match the echo, because the model it developed of the previous end path does not accurately represent the impulse response of the new end path. The result is poor cancellation, which causes the ERLE to drop to near unity and appear as near end speech to the double talk detector, even when near end speech is not present. This, in turn, causes the detector to inhibit the echo canceller from converging and developing an accurate model of the new end path impulse response.

OBJECTS OF THE INVENTION

An object of the present invention is to provide an improved double talk detector for an echo canceller, which senses and distinguishes between double talk and an end path switch.

Another object is to provide a double talk detector that monitors the ratio of 4W transmit in energy to 4W transmit out energy (ERLE), along with the change and direction of change of an estimated impulse response, to control convergence of the canceller.

A further object is to provide a double talk detector which enables the echo canceller to converge in the absence of near end speech and when a new end path is established, but prevents the canceller from converging when near end speech is present.

SUMMARY OF THE INVENTION

In accordance with the present invention, there is provided a double talk detector for controlling convergence of an adaptive filter, wherein the adaptive filter is adapted to be coupled to transmit and receive paths of a telephone network for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate signal is algebraically combined with a transmit in path signal to yield a transmit out path signal. The transmit in signal at least occasionally includes signals from a near end of the network, and the double talk detector comprises means for generating an echo return loss enhancement (ERLE) signal, having a value in accordance with the ratio of transmit in signal energy to transmit out signal energy; and means for detecting whether the adaptive filter is in a converged state, such that the estimated impulse response is a good estimate of the actual impulse response of the end path loop, or whether it is in an unconverged state, such that the estimated impulse response is not a good estimate of the actual impulse response. In addition, the double talk detector includes means, responsive to both the ERLE signal value and to the state of convergence of the adaptive filter, for controlling updating of the estimated impulse response and convergence of the adaptive filter.

In a preferred embodiment, the means for controlling updating of the adaptive filter is responsive to either a sufficiently low ERLE signal value and an unconverged state of the adaptive filter, or to a sufficiently high ERLE signal value, to enable the adaptive filter to update the estimated impulse response. The means for controlling also is responsive to a sufficiently low ERLE signal value and a converged state of the adaptive filter to inhibit the adaptive filter from updating the estimated impulse response. In this manner, the double talk detector allows the adaptive filter to update the estimated impulse response and converge when no near end signals are present on the transmit path and in response to an end path switch, but prevents the adaptive filter fromm updating the estimated impulse response and being diverged when near end signals are present on the transmit path.

The invention also contemplates a method of controlling convergence of an adaptive filter, which comprises the steps of generating an echo return loss enhancement (ERLE) signal having a value in accordance with the ratio of transmit in signal energy to transmit out signal energy; detecting whether the adaptive filter is in a converged or unconverged state; and controlling updating of the estimated impulse response and convergence of the adaptive filter in accordance with the value of the ERLE signal and the detected state of convergence of the adaptive filter.

In a preferred practice of the method, the controlling step is responsive to either a sufficiently low ERLE signal value and a detected unconverged state of the adaptive filter, or to a sufficiently high ERLE signal value, to enable the adaptive filter to update the estimated impulse response. The controlling step also is responsive to a sufficiently low ERLE signal value and a detected converged state of the adaptive filter to inhibit the adaptive filter from updating the estimated impulse response. In this manner, the adaptive filter is enabled to update the estimated impulse response when no near end signals are present on the transmit path and in response to an end path switch, but is prevented from updating the estimated impulse response and being diverged when near end signals are present on the transmit path.

The foregoing and other objects, advantages and features of the invention will become apparent upon a consideration of the following detailed description, when taken in conjunction with the accompanying drawings.

DETAILED DESCRIPTION

Figure 1:
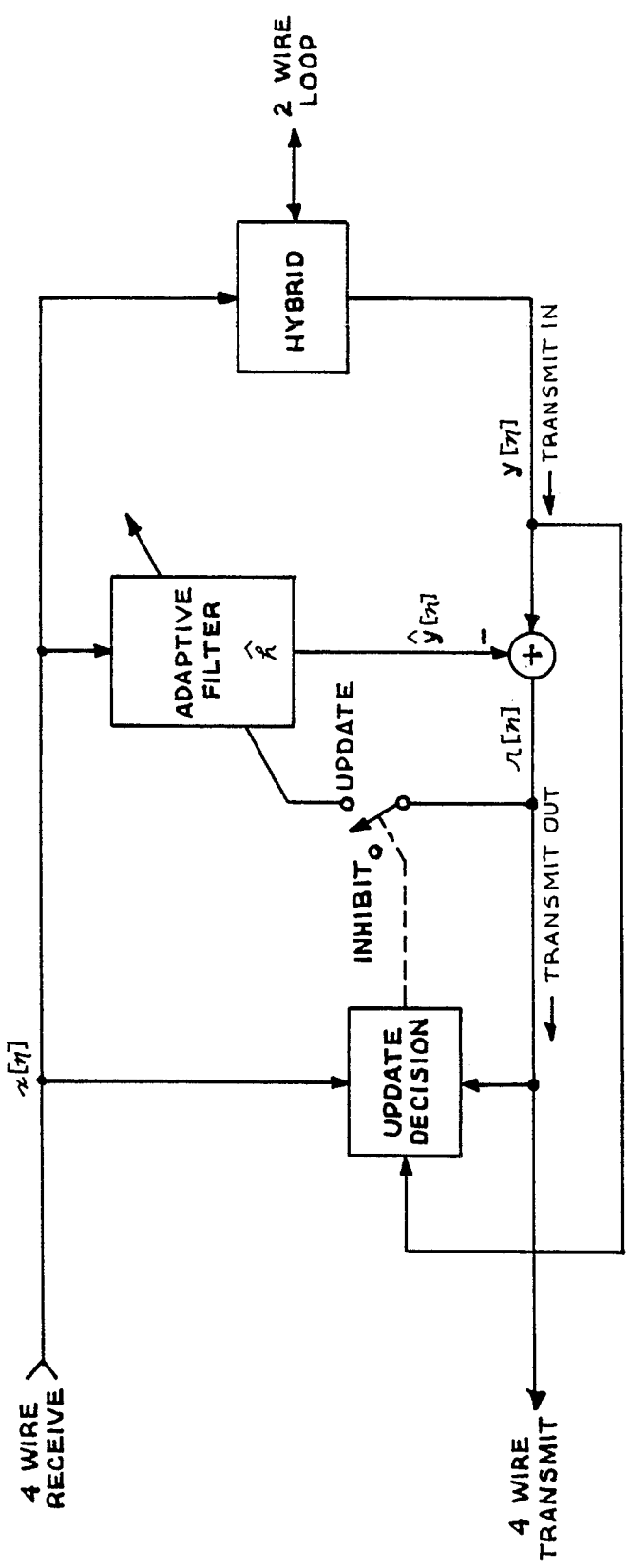
FIG. 1 is a schematic representation of an echo canceller having a double talk detector according to the teachings of the invention.

FIG. 1 illustrates one end of a telephone network at which four wire (4W) and two wire (2W) segments are joined by a hybrid circuit. The hybrid circuit couples an input signal on the 4W receive path to the 2W segment, and an output signal on the 2W segment to the 4W transmit path. Ideally, all of the signal energy on the 4W receive path is coupled to the 2W segment. In practice, impedance mismatch in the hybrid circuit usually causes some of the energy on the receive path to be reflected onto the transmit path. If there is enough delay in the network, the reflected signal is heard as echo by the speaker who originated it at the far end. Consequently, also connected to the telephone network, between the 4W receive and transmit paths, is an echo canceller that separates the transmit path into transmit in and transmit out paths and cancels the echo signal on the transmit in path, so that it does not appear on the transmit out path.

The echo canceller includes an adaptive filter that develops estimated taps or coefficients forming an estimated impulse response of the end path of the network. The algorithm used in the adaptive filter is a variation of the Least Mean Squares (LMS). If x and y are the 4W receive and transmit in signals, respectively, and $x[n]$ and $y[n]$ are samples of those signals at time n, then $x[n]$, a vector whose elements are the last n samples of x, may be defined as:

$$x^T[n] = \{x[n], x[n-1], ..., x[n-(N-1)]\}, \quad (1)$$

where T denotes the transpose operator on the vector. The signal y is the sum of echo e and some noise v. Echo is modeled as the output of a discrete-time filter with input $x[n]$ and finite impulse response h, where $$h^T = \{h_0, h_1, ..., h_{N-1}\}. \quad (2)$$

Therefore, echo e at time n is defined as $$\begin{aligned} e[n] &= x[n]h_0 + x[n-1]h_1 + ... + x[n-N+1]h_{N-1} \\ &= x^T[n]h. \end{aligned} \quad (3) \quad (4)$$

The noise v has various sources, including quantization noise and modeling noise, and is assumed to be uncorrelated with echo e and the receive path signal x. Near end speech can also be modeled as a component of noise.

The object of the algorithm is to identify the vector h, the impulse response of the end path, so that echo e can be reproduced and substracted from the transmit in path signal y. The LMS algorithm establishes a set of adjustable coefficients or taps $\hat{h}_i$, $i=0,1,...N-1$, which are estimates of actual impulse response coefficients $h_j$, and uses them in a convolution process to create an estimate $\hat{y}[n]$ of the transmit in path signal $y[n]$, that occurs in response to the receive path signal, where $$\begin{aligned} \hat{y}[n] &= x[n]\hat{h}_0[n] + x[n-1]\hat{h}_1[n] + ... + x[n-N+1]\hat{h}_{N-1}[n] \\ &= x^T[n]\hat{h}[n]. \end{aligned} \quad (5) \quad (6)$$

The estimate of the transmit in path signal $\hat{y}[n]$ is then algebraically combined with or subtracted from the actual transmit in path signal $y[n]$ to form a residual or transmit out signal $r[n]$, where $$\begin{aligned} r[n] &= y[n] - \hat{y}[n] \\ &= x^T[n]h + v[n] - x^T[n]\hat{h}[n]. \end{aligned} \quad (7) \quad (8)$$

In an attempt to minimize the energy of the transmit out signal $r[n]$, the coefficients of the estimated impulse response $\hat{h}[n]$ are periodically updated at each time n according to $$\hat{h}[n] = \hat{h}[n-1] + \mu[n]r[n]x[n], \quad (9)$$

where the estimated impulse response $\hat{h}[n]$ is a $256 \times 1$ vector containing the end path estimate at time n, $\mu$ is the adaptation step size or adaptive gain, and the vector x[n] contains the past 256 receive path signal samples.

Near end speech on the 2W segment appears on the 4W transmit path as part of the transmit in signal y[n], and since it affects the transmit out signal r[n], it is unwanted noise as far as the convergence algorithm is concerned. Near end speech or double talk will cause the echo canceller to diverge if it continues updating the tap weights or estimated impulse response coefficients ĥ[n] while it is present. A critical component of an echo canceller is therefore a near end speech or double talk detector to inhibit adaptation or convergence of the adaptive filter while double talk is occurring.

A performance measure that represents the effectiveness of the cancellation process, or the degree of change in the transmit out signal as a result of the echo estimate being substracted from the transmit in signal, can be used to detect double talk. One such performance measure is echo return loss enhancement (ERLE). The ERLE is the ratio of the energy of the 4W transmit in signal y[n] to the transmit out signal r[n], i.e., $$ERLE = \frac{y[n]}{r[n]}. \tag{10}$$

In single talk, when there is only far end speech, the adaptive filter can cancel most of the transmit in signal energy, leaving little transmit out signal energy, so the ERLE has a value much greater than one. When near end speech is present, however, the adaptive filter can cancel only a small portion of the transmit in signal energy, allowing near speech to pass as the transmit out signal r[n]. Under this condition, the ERLE approaches one. The double talk detector can then simply monitor the value of the ERLE. When the ERLE is high, indicating an absence of near end speech, the detector allows the estimated impulse response coefficients to update, so the adaptive filter converges. If the ERLE decreases, indicating that near end speech is present, the detector freezes the taps and inhibits further updating of the estimated impulse response to prevent the adaptive filter from being diverged by the near end speech.

The double talk detection method of sensing the ERLE works well in a stable environment where the end path loop of the network remains substantially constant. The method suffers, however, from a fundamental limitation in a switched environment, where establishing different connections establishes different end paths. The ability of the echo canceller to remove echo from the 4W transmit path depends upon it being able to develop an accurate model of the end path loop impulse response, i.e., to develop estimated impulse responses $h_j$ that fairly accurately represent the actual end path impulse response h. When the end path is first switched, the adaptive filter can no longer match the echo, because it has within it a model of the previous end path, which does not match the new end path. This causes the ERLE to decrease in value to near unity, and therefore appear as near end speech to the double talk detector. Absent more, the detector will then inhibit updating of the taps, so the adaptive filter will not converge and develop an accurate model of the new end path impulse response.

To overcome the problem of sensing end path switches as near end speech, the invention provides means by which the detector can determine when a decrease in the ERLE is attributable to an end path switch and, despite the decreased ERLE, enable the adaptive filter to update its taps and converge. Absent an inhibit command from the detector, the adaptive filter is updated at every time n in an attempt to minimize the energy of the transmit out signal r[n]. The change in the estimated impulse response, Δĥ[n], from time n to time n+1, may be defined as a 256×1 vector, where $$\Delta\hat{h}[n] = \mu[n]r[n] \times [n]. \tag{11}$$

The Δĥ[n] vector points in the direction of change of the end path impulse response estimates. When the estimates are far from the true parameter values, the adaptive filter is in an unconverged state, and the Δĥ[n] vector points strongly in the particular direction that would converge the filter and minimize the transmit out signal r[n]. If the impulse response estimates are close to the true parameter values, the adaptive filter is in a converged state, and the Δĥ[n] vector points in no particular direction over time, but instead wanders around the true parameter values.

To determine when a decrease in the ERLE is attributable to an end path switch, the algorithm defines a measure of the strength of the directionality of change of the Δĥ[n] vector, that serves as an end path switch detector. The end path switch detector output and the ERLE measurements are then combined to form the double talk detector. When the ERLE is low and the directional measure of change of the Δĥ[n] vector, averaged over time, is high (indicating that the adaptive filter is diverged), it is assumed that a change in the end path impulse response, due to an end path switch, is causing poor cancellation. Under this circumstance, the double talk detector enables updating of the estimated impulse response $\hat{h}_j$ allow the adaptive filter to converge to the new end path. If, however, while the ERLE has a low value the directional measure of change of the Δĥ[n] vector, averaged over time, also is low (indicating that the adaptive filter is converged), then it is known that near end speech is causing poor cancellation. In this case, the double talk detector inhibits updating of the estimated impulse response $\hat{h}_j$, to prevent the near end speech from diverging the adaptive filter, until either the ERLE or the directional measure of change of the Δĥ[n] vector increases.

In choosing a measure of the directionality of change of the Δĥ[n] vector, its time average, Δh'[n], is computed as $$\Delta h'[n] = C_1 \Delta h'[n-1] + \Delta\hat{h}[n], \tag{12}$$

where $C_1$ is a scaler. The Δh'[n] vector is obtained by passing the Δĥ[n] vector through an averaging circuit, which advantageously is a low pass filter. At time n, the Δĥ[n] vector is correlated with the Δh'[n−1] vector by taking their dot product (multiplying their vectors), such that the correlation s[n] is defined as $$\begin{aligned} s[n] &= \text{sign}\{\Delta h'[n-1] \text{dot} \Delta\hat{h}[n]\} \\ &= \text{sign}\left\{ \sum_{i=0}^{255} h'_i[n-1]\Delta\hat{h}_i[n] \right\} = \pm 1. \end{aligned} \tag{13}$$
$$\tag{14}$$

When the adaptive filter is in an unconverged state, it is expected that the direction each estimated tap moves at time n, Δĥ$_i$[n], will be in the same general direction that it moved in the past, Δh'$_i$[n−1]. This causes the terms in the dot product to contribute a net positive amount to the overall sum. In the unconverged state of the adaptive filter, the expected value of the correlation s[n] therefore approaches one.

When the adaptive filter is converged, the direction a particular tap moves at time n is uncorrelated with the direction it moved in the past, since in this case the $\Delta\hat{h}[n]$ vector wanders around the true parameter values. This is true even in the presence of double talk, because the expected value of the estimated impulse response $\hat{h}[n]$, averaged over time, is independent of near end speech. The dot product then has no net positive bias, but instead wanders around a zero mean.

The final step in the algorithm is to determine the weighted average s'[n] of the correlation s[n] by a low pass filter, such that $$s'[n] = C_2 s'[n-1] + (1-C_2)s[n], -1 \leq s'[n] \leq 1, \quad (15)$$

where $C_2$ is a constant. A value of s'[n] close to one indicates that the adaptive filter is unconverged and that its taps or impulse response coefficients have been trying to move in the same direction for some time. This condition signals an end path switch, and that the adaptive filter should be allowed to converge. On the other hand, a value of s'[n] near zero (or possibly negative) indicates that the filter is converged and updating should be inhibited if the ERLE has a low value (indicating near end speech). The ERLE detector and end path switch detector are part of an update decision circuit in FIG. 1.

Figure 3:
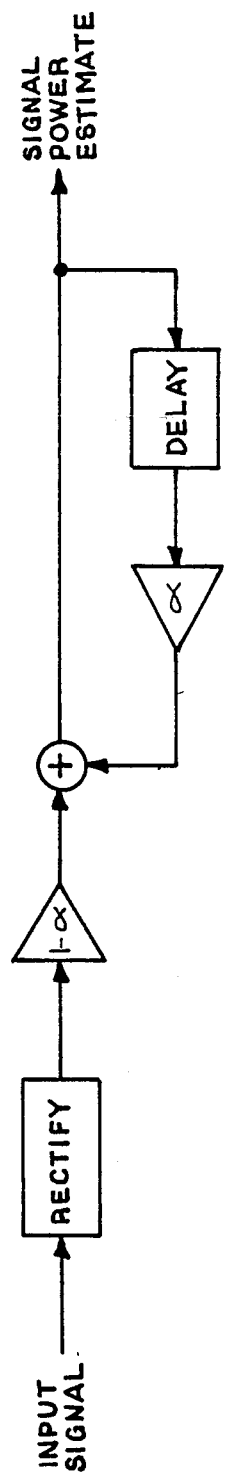
FIG. 3 is a schematic representation of a power measuring circuit that is part of the detector.
Figure 2:
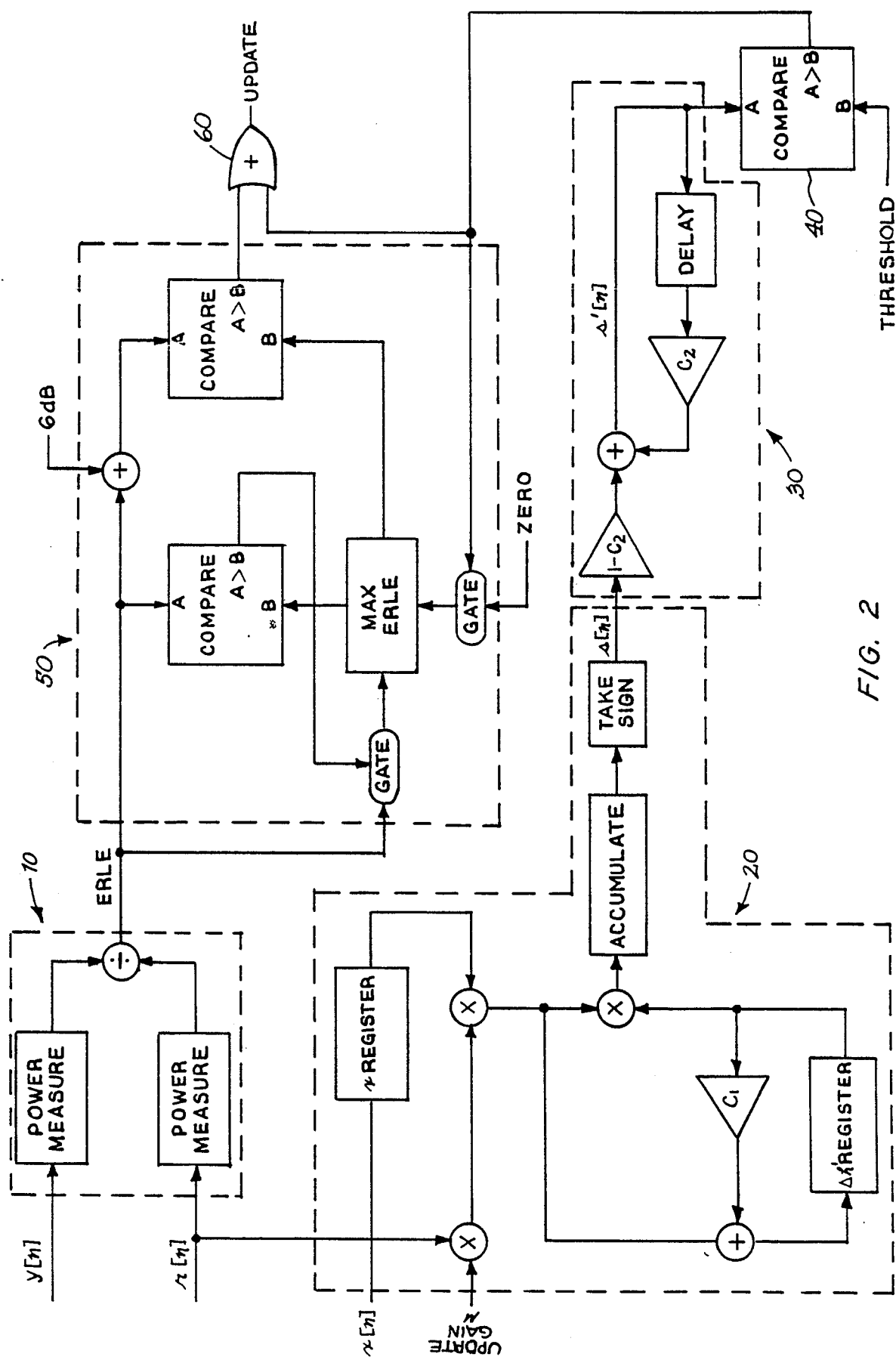
FIG. 2 is a schematic representation of the double talk detector.

FIG. 2 iustrates one possible arrangement of a double talk detector circuit fpr performing the described functions. The detector circuit includes an ERLE measuring circuit, enclosed in dashed lines and indicated generally at 10, for generating the ERLE value according to equation (10). The ERLE measuring circuit has a pair of identical power measuring circuits, one of which is shown in greater detail in FIG. 3. Also included in the double talk detector are an x register, a $\Delta h'$ register, an accumulate circuit and a take sign circuit, enclosed in dashed lines and indicated generally at 20, for developing the correlation s[n] according to equations (13) and (14). The correlation s[n] is applied to an averaging circuit, enclosed in dashed line and indicated generally at 30, that develops the average correlation s'[n] according to equation (15), and applies it to one input to a comparator circuit 40. Another input to the comparator receives the treshold set for s'[n]. The output from the comparator, along with the ERLE generated by the circuit 10, are applied as inputs to a circuit enclosed in dashed lines and indicated generally at 50. The circuit 50 includes an $ERLE_{max}$ circuit that stores the maximum value of the ERLE that has occurred since the last time the average correlation s'[n] exceeded its threshold (i. e., since the last time the adaptive filter was unconverged), and determines whether the measured ERLE is greater than $ERLE_{max}$ less 6 dB, as well as whether the measured ERLE is greater than $ERLE_{max}$. An output from the circuit 50 is applied to one input to an OR gate 60, the other input to which receives the output from the comparator circuit 40. The output from the OR gate is coupled to the adaptive filter to control its adaptation or convergence, i.e., to either allow or inhibit updating of the filter.

Figure 4:
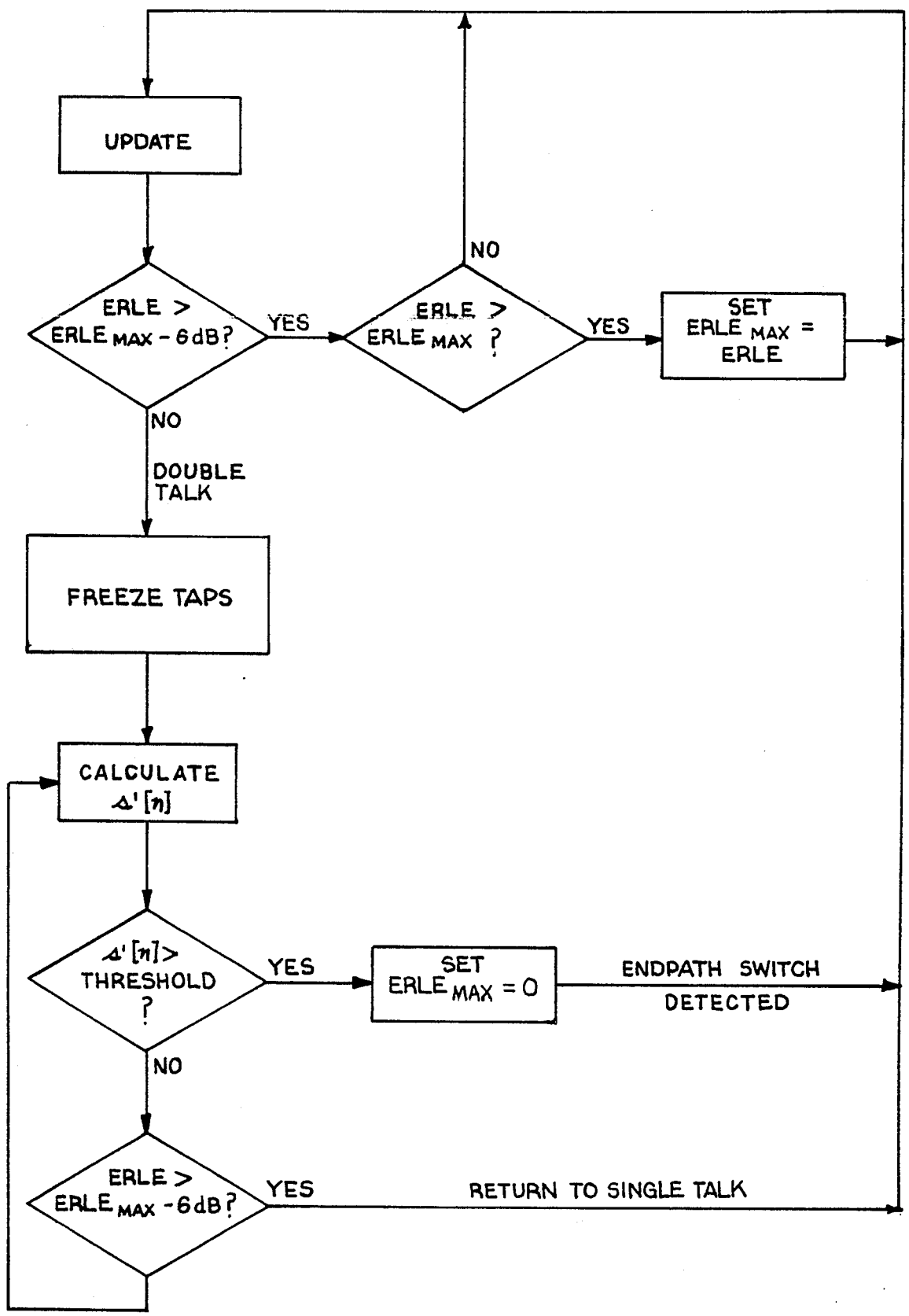
FIG. 4 is a flowchart for a double talk detection algorithm.

A flowchart describing the double talk detection algorithm is shown in FIG. 4. The algorithm begins with detecting whether the measured ERLE is greater than $ERLE_{max}$ less 6 dB. If it is, a determination is then made whether the measured ERLE is greater than ER-$LE_{max}$. Whether or not it is, adaptation of the filter is allowed to continue, since a measured ERLE that is greater than $ERLE_{max}$ less 6 dB indicates the absence of near end speech. However, if it is, the stored value of $ERLE_{max}$ is set equal to the measured ERLE.

If the measured ERLE is not greater than $ERLE_{max}$ less 6 dB, that indicates that double talk may be occurring, and the adaptive filter taps are frozen and the correlation s[n] is developed. The next step is to calculate the average correlation s'[n], and in a succeeding step compare it with its threshold. If the average correlation is greater than its threshold, that indicates that the measured ERLE is low because there is poor correlation since the adaptive filter is unconverged as a result of an end path switch, i.e., a new end path loop with a different impulse response has been established. In this case, the $ERLE_{max}$ is set equal to zero and the adaptive filter is allowed to update. However, if the average correlation s'[n]is less than its threshold, indicating that the adaptive filter is converged, then it is again determined whether the measured ERLE is greater than $ERLE_{max}$ less 6 dB. If it is, that indicates that near end speech is not present, and the adaptive filter is allowed to update. If it is not, then that indicates that near end speech is present, and to prevent the near end speech from diverging the adaptive filter, updating of the filter continues to be inhibited and the algorithm recalculates a new average correlation s'[n].

As long as the detected ERLE is at least equal to $ERLE_{max}$ less 6 dB, as measured since the last end path switch, adaptation of the filter continues. If the measured ERLE falls below this level, the taps are frozen and the end path switch detector is turned on.

While one embodiment of the invention has been described in detail, various modifications and other embodiments thereof may be devised by one skilled in the art without departing from the spirit and scope of the invention, as defined in the appended claims.

What is claimed is:

1. A double talk detector for controlling convergence of an adaptive filter, wherein the adaptive filter is for being coupled to transmit and receive paths for separating the transmit path into transmit in and transmit out paths, for developing and periodically updating an adjustable estimated impulse response $\hat{h}[n]$ of an end path and for generating, in accordance with the estimated impulse response and a receive path signal, an estimate of an echo signal occurring on the transmit in path in response to the receive path signal, which echo estimate signal is algebraically combined with a transmit in path signal to yield a transmit out path signal, said double talk detector comprising an echo return loss enhancement (ERLE) detector for generating an ERLE signal having a value in accordance with the ratio of transmit in signal energy to transmit out signal energy; an end path switch detector for developing a $\Delta\hat{h}[n]$ vector representing the change in the estimated impulse response from one time period to the next, and for generating a signal having a value in accordance with the strength of the directionality of change of the $\Delta\hat{h}[n]$ vector; and comparator means for sensing the values of said ERLE signal and said end path switch detector signal and for controlling convergence of the adaptive filter in accordance with the values, such that the adaptive filter is enabled to update the estimated impulse response and converge whenever said ERLE signal has a value greater than a selected value, irrespective of the value of said end path switch detector signal, and such that the adaptive filter is inhibited from updating the estimated impulse response and converging when said ERLE signal value is less than said selected value and said end path switch detector signal has a value less than a predetermined value.

2. A double talk detector as in claim 1, wherein said comparator means controls convergence of the adaptive filter such that the adaptive filter is also enabled to update the estimated impulse response when said ERLE signal value is less than said selected value and said end path switch detector signal value is greater than said predetermined value.

3. A double talk detector for controlling convergence of an adaptive filter, wherein the adaptive filter is for being coupled to transmit and receive paths for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate signal is algebraically combined with a transmit in path signal to yield a transmit out path signal, said double talk detector comprising an echo return loss enhancement (ERLE) detector for generating an ERLE signal having a value in accordance with the ratio of transmit in signal energy to transmit out signal energy; an end path switch detector for generating a signal having a value in accordance with the strength of the directionality of change of the estimated impulse response; and comparator means for sensing the values of said ERLE signal and said end path switch detector signal and for controlling convergence of the adaptive filter in accordance with the values, such that the adaptive filter is enabled to update the estimated impulse response and converge whenever said ERLE signal has a value greater than a selected value, irrespective of the value of said end path switch detector signal, the adaptive filter is inhibited from updating the estimated impulse response and converging when said ERLE signal value is less than said selected value and said end path switch detector signal has a value less than a predetermined value, and the adaptive filter is enabled to update the estimated impulse response when said ERLE signal value is less than said selected value and said end path switch detector signal value is greater than said predetermined value, wherein said selected value equals the maximum value of said ERLE signal value, less a constant value, that has occurred since said end path switch detector signal value last exceed said predetermined value, and said end path switch detector signal value is in accordance with the change and direction of change, averaged over time, of the estimated impulse response.

4. A double talk detector for controlling convergence of an adaptive filter, wherein the adaptive filter is for being coupled to transmit and receive paths for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said double talk detector comprising means for generating an echo return loss enhancement (ERLE) signal having a value in accordance with the ratio of transmit in signal energy to transmit out signal energy; means for detecting whether the adaptive filter is in a converged state, such that the estimated impulse response is a good estimate of the actual impulse response of the end path, or if it is in an unconverged state, such that the estimated impulse response is not a good estimate of the actual impulse response of the end path; and means, responsive to the ERLE signal value and to the detected state of convergence of the adaptive filter, for controlling updating of the estimated impulse response and convergence of the adaptive filter, wherein said means for detecting comprises means for generating a $\Delta\hat{h}[n]$ vector representing the change in the estimated impulse response from one time period n to the next time period n+1, means for time averaging said $\Delta\hat{h}[n]$ vector to generate a $\Delta h'[n]$ vector, means for generating a correlation s[n] by taking the dot product of said $\Delta\hat{h}[n]$ vector and a $\Delta h'[n-1]$ vector representing the change in the time averaged estimated impulse response from the time period n−1 to the next time period n, means for time averaging said correlation s[n] to generate an average correlation s'[n], and means for comparing the value of said average correlation s'[n] with a threshold value to determine whether the adaptive filter is in a converged or an unconverged state.

5. A double talk detector as in claim 4, wherein said means for controlling is responsive to a sufficiently high ERLE signal value to enable the adaptive filter to update the estimated impulse response, irrespective of the detected state of convergence of the adaptive filter.

6. A double talk detector as in claim 4, wherein said means for controlling is responsive to a sufficiently low ERLE signal value and a detected unconverged state of the adaptive filter to enable the adaptive filter to update the estimated impulse response.

7. A double talk detector as in claim 4, wherein said means for controlling is responsive to a sufficiently low ERLE signal value and a detected converged state of the adaptive filter to inhibit the adaptive filter from updating the estimated impulse response.

8. A double talk detector as in claim 4, wherein said means for controlling is responsive to either a sufficiently low ERLE signal value and a detected unconverged state of the adaptive filter, or to a sufficiently high ERLE signal value, to enable the adaptive filter to update the estimated impulse response, and is responsive to a sufficiently low ERLE signal value and a converged state of the adaptive filter to inhibit the adaptive filter from updating the estimated impulse response, whereby the double talk detector allows the adaptive filter to update the estimated impulse response when no end path output signals are present on the transmit in path and when an unconverged state of the adaptive filter is detected, and prevents the adaptive filter from updating the estimated impulse response when end path output signals are present on the transmit in path, so that the adaptive filter is not diverged by end path output signals.

9. A double talk detector as in claim 8, including means for establishing a selected threshold value, said ERLE signal having a sufficiently low value when it is less than, and a sufficiently high value when it is greater than, said selected threshold value.

10. A double talk detector as in claim 4, wherein said means for detecting the state of convergence of the adaptive filter includes means for sensing the change and direction of change, averaged over time, of the estimated impulse response.

11. A doubletalk detector for controlling convergence of an adaptive filter, wherein the adaptive filter is for being coupled to transmit and receive paths for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said double talk detector comprising means for generating an echo return loss enhancement (ERLE) signal having a value in accordance with the ratio of transmit in signal energy to transmit out signal energy; means for detecting whether the adaptive filter is in a converged state, such that the estimated impulse response is a good estimate of the actual impulse response of the end path, or if it is in an unconverged state, such that the estimated impulse response is not a good estimate of the actual impulse response of the end path; and means, responsive to the ERLE signal value and to the detected state of convergence of the adaptive filter, for controlling updating of the estimated impulse response and convergence of the adaptive filter, wherein said means for controlling is responsive to either a sufficiently low ERLE signal value and a detected unconverged state of the adaptive filter, or to a sufficiently high ERLE signal value, to enable the adaptive filter to update the estimated impulse response, and is responsive to a sufficiently low ERLE signal value and a converged state of the adaptive filter to inhibit the adaptive filter from updating the estimated impulse response, whereby the double talk detector allows the adaptive filter to update the estimated impulse response when no end path output signals are present on the transmit in path and when an unconverged state of the adaptive filter is detected, and prevents the adaptive filter from updating the estimated impulse response when end path output signals are present on the transmit in path, so that the adaptive filter is not diverged by end path output signals, and including means for establishing a selected threshold value, said ERLE signal having a sufficiently low value when it is less than, and a sufficiently high value when it is greater than, said selected threshold value, wherein said selected threshold value is equal to the maximum ERLE signal value, less a constant value, that has occurred since the last time an unconverged state of the adaptive filter was detected.

12. A double talk detector for controlling convergence of an echo canceller, wherein the echo canceller is adapted to be coupled with transmit and receive paths of a telephone network for separating the transmit path into transmit in and transmit out paths, for developing and periodically updating an adjustable estimated impulse response $\hat{h}[n]$ of an end path, for generating, through a process including convolution of the estimated impulse response and a receive path signal $x[n]$ from a far end of the network, an estimate $\hat{y}[n]$ of an echo signal occurring on the transmit in path in response to the receive path signal, and for subtracting the echo estimate signal from a transmit in path signal $y[n]$ to yield a transmit out path signal $r[n]$, wherein the transmit in path signal at least occasionally includes signals originated at a near end of the network, said double talk detector comprising means for generating an ERLE signal having a value in accordance with the energies of $y[n]/r[n]$; means for comparing the ERLE signal value with a selected threshold value; means for detecting whether the echo canceller is in a converged state, such that the estimated impulse response is a good estimate of the actual impulse response of the end path, or whether it is in an unconverged state, such that the estimated impulse response is a poor estimate of the actual impulse response of the end path; and means, responsive to the comparison of said ERLE signal to said selected threshold value and to the detected state of convergence of the echo canceller, for controlling updating of the estimated impulse response and convergence of the echo canceller, wherein said selected threshold value equals the maximum value of said ERLE signal, less a constant value, that has occurred since said detecting means last detected an unconverged state of the echo canceller, and said means for controlling convergence of the echo canceller enables the echo canceller to update the estimated impulse response whenever said ERLE signal value is greater than said selected value.

13. A double talk detector as in claim 12, wherein said means for detecting the state of convergence of the echo canceller includes means for generating a $\Delta\hat{h}[n]$ vector representing the change in the estimated impulse response $\hat{h}[n]$ from one time period n to the next time period n+1, means for time averaging said $\Delta\hat{h}[n]$ vector to generate a $\Delta h'[n]$ vector, means for generating a correlation $s[n]$ by taking the dot product of said $\Delta\hat{h}[n]$ vector and a $\Delta h'[n-1]$ vector representing the change in the time averaged estimated impulse response from the time period n−1 to the next time period n, means for time averaging said correlation $s[n]$ to generate an average correlation $s'[n]$, and means for comparing the value of said average correlation $s'[n]$ with said predetermined threshold value to determine whether the echo canceller is in a converged or unconverged state.

14. A double talk detector as in claim 12, wherein said means for detecting the state of convergence of the echo canceller includes means for generating a detector signal having a value in accordance with the strength of the directionality of change of the estimated impulse response, and means for comparing said detector signal value with a predetermined threshold value.

15. A double talk detector as in claim 13, wherein said means for controlling convergence of the echo canceller includes means, responsive to said ERLE signal value being less than said selected threshold value and to said average correlation $s'[n]$ value being greater than said predetermined threshold value, for setting said selected threshold value to zero and enabling the echo canceller to update the estimate impulse response.

16. A double talk detector as in claim 13, wherein said means for controlling convergence of the echo canceller includes means, responsive to said ERLE signal value being less than said selected threshold value and to said average correlation $s'[n]$ value being less than said predetermined threshold value, for again comparing said ERLE signal value with said selected threshold value and for either enabling the echo canceller to update the estimated impulse response and converge if said ERLE signal value is greater than said selected threshold value, or for inhibiting the echo canceller form updating the estimated impulse response and causing said means for detecting to generate a new average correlation s'[n] and compare said new average correlation s'[n] value with said predetermined threshold value if said ERLE signal value is less than said selected threshold value.

17. A double talk detector for controlling convergence of an adaptive filter, wherein the adaptive filter is for being coupled to transmit and receive paths for separating the transmit path into transmit in and transmit out paths, for developing and periodically updating an adjustable estimated impulse response h[n] of an end path and for generating, in accordance with the estimated impulse response and a receive path signal, an estimate of an echo signal occurring on the transmit in path in response to the receive path signal, which echo estimate signal is algebraically combined with a transmit in path signal to yield a transmit out path signal, said double talk detector comprising means for generating a change enhancement signal having a value representative of the degree of change in the transmit out signal in response to the echo estimate signal being algebraically combined with the transmit in signal; an end path detector for developing a $\Delta\hat{h}[n]$ vector representing the change in the estimated impulse response from one time period to the next and for generating a signal having a value in accordance with the strength of the directionality of change of the $\Delta\hat{h}[n]$ vector; and comparator means for sensing the values of said change enhancement signal and said end path detector signal and for controlling convergence of the adaptive filter in accordance with the values, such that the adaptive filter is enabled to update the estimated impulse response and converge whenever said change enhancement signal has a value representing at least a selected degree of change in the transmit out signal, irrespective of the value of said end path switch detector signal, and such that the adaptive filter is inhibited from updating the estimated impulse response and converging when said change enhancement signal has a value representing less than said selected degree of change in the transmit out signal and said end path switch detector signal has a value less than a predetermined value.

18. A double talk detector as in claim 17, wherein said comparator means controls convergence of the adaptive filter such that the adaptive filter is also enabled to update the estimated impulse response when said change enhancement signal has a value representing less than said selected degree of change in the transmit out signal and said end path switch detector signal value is greater than said predetermined value.

19. A double talk detector for controlling convergence of an adaptive filter, wherein the adaptive filter is for being coupled to transmit and receive paths for separating the transmit path into transmit in and transmit out paths, for developing and periodically updating an adjustable estimated impulse response $\hat{h}[n]$ of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said double talk detector comprising means for generating a change enhancement signal having a value representative of the degree of change in the transmit out signal in response to the echo estimate signal being algebraically combined with the transmit in signal; means for detecting whether the adaptive filter is in a converged state, such that the estimated impulse response is a good estimate of the actual impulse response of the end path, or if it is in an unconverged state, such that the estimated impulse response is not a good estimate of the actual impulse response of the end path, said means for detecting including means for developing a $\Delta\hat{h}[n]$ vector representing the change in the estimated impulse response from one time period to the next, for generating a signal having a value in accordance with the strength of the directionality of change of the $\Delta\hat{h}$ vector and for comparing the signal with a threshold value to detect whether the adaptive filter is in a converged or unconverged state; and means, responsive to the change enhancement signal value and to the detected state of convergence of the adaptive filter, for controlling updating of the estimated impulse response and convergence of the adaptive filter.

20. A double talk detector as in claim 19, wherein said means for controlling is responsive to a change enhancement signal value representing at least a selected degree of change in the transmit out signal to enable the adaptive filter to update the estimated impulse response, irrespective of the detected state of convergence of the adaptive filter.

21. A double talk detector as in claim 19, wherein said means for controlling is responsive to a change enhancement signal value representing less than a selected degree of change in the transmit out signal and a detected unconverged state of the adaptive filter to enable the adaptive filter to update the estimated impulse response.

22. A double talk detector as in claim 19, wherein said means for controlling is responsive to a change enhancement signal value representing less than a selected degree of change in the transmit out signal and a detected converged state of the adaptive filter to inhibit the adaptive filter from updating the estimated impulse response.

23. A double talk detector as in claim 19, wherein said means for controlling is responsive to either a change enhancement signal value representing less than a selected degree of change in the transmit out signal and a detected unconverged state of the adaptive filter, or to a change enhancement signal value representing at least said selected degree of change in the transmit out signal, to enable the adaptive filter to update the estimated impulse response, and is responsive to a change enhancement signal value representing less than said selected degree of change in the transmit out signal and a converged state of the adaptive filter to inhibit the adaptive filter from updating the estimated impulse response, whereby the double talk detector allows the adaptive filter to update the estimated impulse response when no end path output signals are present on the transmit in path and when an unconverged state of the adaptive filter is detected, and prevents the adaptive filter from updating the estimated impulse response when end path output signals are present on the transmit in path, so that the adaptive filter is not diverged by end path output signals.

24. A double talk detector as in claim 19, wherein said means for detecting the state of convergence of the adaptive filter includes means for sensing the change and direction of change, averaged over time, of the estimated impulse response.

25. A double talk detector for controlling convergence of an echo canceller, wherein the echo canceller is adapted to be coupled with transmit and receive paths of a telephone network for separating the transmit path into transmit in and transmit out paths, for developing and periodically updating an adjustable estimated impulse response ĥ[n] of an end path, for generating, through a process including convolution of the estimated impulse response and a receive path signal from a far end of the network, an estimate of an echo signal occurring on the transmit in path in response to the receive path signal, and for subtracting the echo estimate signal from a transmit in path signal to yield a transmit out path signal, wherein the transmit in path signal at least occasionally includes signals originated at a near end of the network, said double talk detector comprising means for generating a change enhancement signal having a value representative of the degree of change in the transmit out signal in response to the echo estimate signal being subtracted from the transmit in signal; means for comparing said change enhancement signal value with a selected threshold value; means for detecting whether the echo canceller is in a converged state, such that the estimated impulse response is a good estimate of the actual impulse response of the end path, or whether it is in an unconverged state, such that the estimated impulse response is a poor estimate of the actual impulse response of the end path, said means for detecting including means for developing a Δĥ[n] vector representing the change in the estimated impulse response from one time period to the next, for generating a signal having a value in accordance with the strength of the directionality of change of the Δĥ vector and for comparing the signal with a threshold value to detect whether the adaptive filter is in a converged or unconverged state; and means, responsive to the value of said change enhancement signal with respect to said selected threshold value and to the detected state of convergence of the echo canceller, for controlling updating of the estimated impulse response and convergence of the echo canceller.

26. A method of controlling convergence of an adaptive filter, wherein the adaptive filter is for being coupled to transmit and receive paths for separating the transmit path into transmit in and transmit out paths, for developing and periodically updating an adjustable estimated impulse response ĥ[n] of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, said method comprising the steps of generating an echo return loss enhancement (ERLE) signal having a value in accordance with the ratio of transmit in signal energy to transmit out signal energy; generating an end path switch signal, said generating step including developing a Δĥ vector representing the change in the estimated impulse response from one time period to the next and generating the end path switch signal to have a value in accordance with the strength of the directionality of change of the Δĥ[n] vector; sensing the values of the ERLE signal and end path switch signal; and controlling convergence of the adaptive filter in accordance with the sensed signal values, such that the adaptive filter is enabled to update the estimated impulse response and converge whenever the ERLE signal value is greater than a selected value, irrespective of the value of the end path switch signal, and such that the adaptive filter is inhibited from updating the estimated impulse response when the ERLE signal value is less than the selected value and the end path switch signal has a value less than a predetermined value.

27. A method as in claim 26, wherein said controlling step also enables the adaptive filter to update the estimated impulse response when the ERLE signal value is less than the selected value and the end path switch signal value is greater than the predetermined value.

28. A method of controlling convergence of an adaptive filter, wherein the adaptive filter is for being coupled to transmit and receive paths for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, said method comprising the steps of generating an echo return loss enhancement (ERLE) signal having a value in accordance with the ratio of transmit in signal energy to transmit out signal energy; generating an end path switch signal having a value in accordance with the strength of the directionality of change of the estimated impulse response; sensing the values of the ERLE signal and end path switch signal; and controlling convergence of the adaptive filter in accordance with the sensed signal values, such that the adaptive filter is enabled to update the estimated impulse response and converge whenever the ERLE signal value is greater than a selected value, irrespective of the value of the end path switch signal, and such that the adaptive filter is inhibited from updating the estimated impulse response when the ERLE signal value is less than the selected value and the end path switch signal has a value less than a predetermined value, said controlling step also enabling the adaptive filter to update the estimated impulse response when the ERLE signal value is less than the selected value and the end path switch signal value is greater than the predetermined value, and including the step of setting the selected value equal to the maximum ERLE signal value, less a preselected value, that has occurred since the end path switch signal value last exceeded the predetermined value, and wherein end path switch detector signal is generated to have a value in accordance with the change and direction of change, averaged over time, of the estimated impulse response.

29. A method of controlling convergence of an adaptive filter, wherein the adaptive filter is for being coupled to transmit and receive paths for separating the transmit path into transmit in and transmit out paths, for developing and periodically updating an adjustable estimated impulse response h[n] of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said method comprising the steps of generating an echo return loss enhancement (ERLE) signal having a value in accordance with the ratio of transmit in signal energy to transmit out signal energy; detecting whether the adaptive filter is in a converged state, such that the estimated impulse response is a good estimate of the actual impulse response of the end path, or if the adaptive filter is in an unconverged state, such that the estimated impulse response is not a good estimate of the actual impulse response, said detecting step including developing a $\Delta\hat{h}[n]$ vector representing the change in the estimated impulse response from one time period to the next, generating a signal having a value in accordance with the strength of the directionality of change of the $\Delta\hat{h}[n]$ vector and comparing the signal values with a threshold value to detect whether the adaptive filter is in a converged or unconverged state; sensing the ERLE signal value and the detected state of convergence of the adaptive filter; and controlling updating of the estimated impulse response and convergence of the adaptive filter in accordance with the sensed value of the ERLE signal and the detected state of convergence of the adaptive filter.

30. A method as in claim 29, wherein said controlling step enables the adaptive filter to update the estimated impulse response and converge whenever the ERLE signal value indicates that end path output signals are not present on the transmit in path.

31. A method as in claim 29, wherein said controlling steps is responsive to a sufficiently high ERLE signal value to enable the adaptive filter to update the estimated impulse response and converge, irrespective of the detected state of convergence of the adaptive filter.

32. A method as in claim 29, wherein said controlling step is responsive to a sufficiently low ERLE signal value and a detected unconverged state of the adaptive filter to enable the adaptive filter to update the estimated impulse and converge.

33. A method as in claim 29, wherein said controlling step is responsive to a sufficiently low ERLE signal value and a detected converged state of the adaptive filter to inhibit the adaptive filter from updating the estimated impulse response.

34. A method as in claim 29, wherein said controlling step is responsive to either a sufficiently low ERLE signal value and a detected unconverged state of the adaptive filter, or to a sufficiently high ERLE signal value, to enable the adaptive filter to update the estimated impulse response and converge, and is responsive to a sufficiently low ERLE signal value and a detected converged state of the adaptive filter to inhibit the adaptive filter from updating the estimated impulse response, whereby said controlling step allows the adaptive filter to update the estimated impulse response when no end path output signals are present on the transmit in path and when an unconverged state of the adaptive filter is detected, and prevents the adaptive filter from updating the estimated impulse response when end path output signals are present on the transmit in path, so that the adaptive filter is not diverged by end path output signals.

35. A method as in claim 34, including the step of establishing a selected threshold value, said step of sensing the ERLE signal value sensing that the ERLE signal value is sufficiently low when it is less than, and is sufficiently high when it is greater than, the selected threshold value.

36. A method as in claim 29, wherein said step of detecting the state of convergence of the adaptive filter includes the step of sensing the change and direction of change, averaged over time, of the estimated impulse response.

37. A method of controlling convergence of an adaptive filter, wherein the adaptive filter is for being coupled to transmit and receive paths for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said method comprising the steps of generating an echo return loss enhancement (ERLE) signal having a value in accordance with the ratio of transmit in signal energy to transmit out signal energy; detecting whether the adaptive filter is in a converged state, such that the estimated impulse response is a good estimate of the actual impulse response of the end path, or if the adaptive filter is in an unconverged state, such that the estimated impulse response is not a good estimate of the actual impulse response; sensing the ERLE signal value and the detected state of convergence of the adaptive filter; and controlling updating of the estimated impulse response and convergence of the adaptive filter in accordance with the sensed value of the ERLE signal and the detected state of convergence of the adaptive filter, wherein said controlling step is responsive to either a sufficiently low ERLE signal value and a detected unconverged state of the adaptive filter, or to a sufficiently high ERLE signal value, to enable the adaptive filter to update the estimated impulse response and converge, and is responsive to a sufficiently low ERLE signal value and a detected converged state of the adaptive filter to inhibit the adaptive filter from updating the estimated impulse response, whereby said controlling step allows the adaptive filter to update the estimated impulse response when no end path output signals are present on the transmit in path and when an unconverged state of the adaptive filter is detected, and prevents the adaptive filter from updating the estimated impulse response when end path output signals are present on the transmit in path, so that the adaptive filter is not diverged by end path output signals, including the step of establishing a selected threshold value, said step of sensing the ERLE signal value sensing that the ERLE signal value is sufficiently low when it is less than, and is sufficiently high when it is greater than, the selected threshold value, and further including the step of setting the selected threshold value equal to the maximum ERLE signal value, less a preselected value, that has occurred since the last time an unconverged state of the adaptive filter was detected.

38. A method of controlling convergence of an adaptive filter, wherein the adaptive filter is for being coupled to transmit and receive paths for separating the transmit path into transmit in and transmit out paths, for developing and periodically updating an adjustable estimated impulse response of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said method comprising the steps of generating an echo return loss enhancement (ERLE) signal having a value in accordance with the ratio of transmit in signal energy to transmit out signal energy; detecting whether the adaptive filter is in a converged state, such that the estimated impulse response is a good estimate of the actual impulse response of the end path, or if the adaptive filter is in an unconverged state, such that the estimated impulse response is not a good estimate of the actual impulse response; sensing the ERLE signal value and the detected state of convergence of the adaptive filter; and controlling updating of the estimated impulse response and convergence of the adaptive filter in accordance with the sensed value of the ERLE signal and the detected state of convergence of the adaptive filter, wherein said step of detecting the state of convergence of the adaptive filter includes the steps of generating a $\Delta \hat{h}[n]$ vector representing the change in the estimated impulse response from one time period n to the next time period n+1, averaging the $\Delta \hat{h}[n]$ vector to generate a $\Delta h'[n]$ vector, generating a correlation s[n] by taking the dot product of the $\Delta \hat{h}[n]$ vector and a $\Delta h'[n-1]$ vector representing the change in the averaged estimated impulse response from the time period n−1 to the next time period n, time averaging the correlation s[n] to generate an average correlation s'[n], and comparing the value of the average correlation s'[n] with a threshold value to determine whether the adaptive filter is in a converged or uncoverged state.

39. A method of controlling convergence of an echo canceller, wherein the echo canceller is adapted to be coupled with transmit and receive paths of a telephone network for separating the transmit path into transmit in and transmit out paths, for developing and periodically updating an adjustable estimated impulse response $\hat{h}[n]$ of an end path, for generating, through a process including convolution of the estimated impulse response and a receive path signal x[n] from a far end of the network, an estimate $\hat{y}[n]$ of an echo signal occurring on the transmit in path in response to the receive path signal, and for subtracting the echo estimate signal from a transmit in path signal y[n] to yield a transmit out path signal r[n], wherein the transmit in path signal at least occasionally includes signals originated at a near end of the network, said method comprising the steps of generating an echo return loss enhancement (ERLE) signal having a value in accordance with the energies of y[n]/r[n]; comparing the ERLE signal value with a selected threshold value; detecting whether the echo canceller is in a converged state, such that the estimated impulse response is a good estimate of the actual impulse response of the end path, or whether it is in an unconverged state, such that the estimated impulse response is a poor estimate of the actual impulse response, said detecting step including developing a $\Delta \hat{h}[n]$ vector representing the change in the estimated impulse response from one time period to the next, generating a signal having a value in accordance with the strength of the directionality of change of the $\Delta \hat{h}[n]$ vector and comparing the signal value with a threshold value to detect whether the adaptive filter is in a converged or unconverged state; and controlling updating of the estimated impulse response and convergence of the echo canceller in accordance with the ERLE signal value and the detected state of convergence of the echo canceller.

40. A method of controlling convergence of an echo canceller, wherein the echo canceller is adapted to be coupled with transmit and receive paths of a telephone network for separating the transmit path into transmit in and transmit out paths, for developing and periodically updating an adjustable estimated impulse response $\hat{h}[n]$ of an end path, for generating, through a process including convolution of the estimated impulse response and a receive path signal x[n] from a far end of the network, an estimate $\hat{y}[n]$ of an echo signal occurring on the transmit in path in response to the receive path signal, and for subtracting the echo estimate signal from a transmit in path signal y[n] to yield a transmit out path signal r[n], wherein the transmit in path signal at least occasionally includes signals originated at a near end of the network, said method comprising the steps of generating an echo return loss enhancement (ERLE) signal having a value in accordance with the energies of y[n]/r[n]; comparing the ERLE signal value with a selected threshold value; detecting whether the echo canceller is in a converged state, such that the estimated impulse response is a good estimate of the actual impulse response of the end path, or whether it is in an unconverged state, such that the estimated impulse response is a poor estimate of the actual impulse response; and controlling updating of the estimated impulse response and convergence of the echo canceller in accordance with the ERLE signal value and the detected state of convergence of the echo canceller, and including the step of setting said selected threshold value equal to the maximum value of the ERLE signal, less a preselected value, that has occurred since an unconverged state of the echo canceller was last detected, and wherein said step of controlling convergence of the echo canceller enables the echo canceller to update the estimated impulse response whenever the ERLE signal value is greater than the selected value.

41. A method as in claim 40, wherein said step of detecting the state of convergence of the echo canceller includes the steps of generating a $\Delta \hat{h}[n]$ vector representing the change in the estimated impulse response $\hat{h}[n]$ from one time period n to the next time period n+1, averaging the $\Delta \hat{h}[n]$ vector to generate a $\Delta h'[n]$ vector, generating a correlation s[n] by taking the dot product of the $\Delta \hat{h}[n]$ vector and a $\Delta h'[n-1]$ vector representing the change in the averaged estimated impulse response from the time period n−1 to the next time period n, time averaging the correlation s[n] to generate an average correlation s'[n], and comparing the value of the average correlation s'[n] with the predetermined threshold value to determine whether the echo canceller is in a converged or unconverged state.

42. A method as in claim 41, wherein said step of controlling convergence of the echo canceller includes the steps, operative in response to the ERLE signal value being less than the selected threshold value and the average correlation s'[n] value being greater than the predetermined threshold value, of setting the selected threshold value to zero and enabling the echo canceller to update the estimated impulse response and converge.

43. A method as in claim 41, wherein said step of controlling convergence of the echo canceller includes the steps, operative upon the ERLE signal value being less than the selected threshold value and the average correlation s'[n] value being less than the predetermined threshold value, of again comparing the ERLE signal value with the selected signal value and either enabling the echo canceller to update the estimated impulse response if the ERLE signal value is greater than the selected threshold value or, if the ERLE signal value is less than the selected value, inhibiting the echo canceller from updating the estimated impulse response and causing said average correlation s'[n] value generating step to generate a new average correlation s'[n] and compare the new average correlation s'[n] value with the predetermined threshold value.

44. A method of controlling convergence of an adaptive filter, wherein the adaptive filter is for being coupled to transmit and receive paths for separating the transmit path into transmit in and transmit out paths, for developing and periodically updating an adjustable estimated impulse response ĥ[n] of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, said method comprising the steps of generating a change enhancement signal having a value representative of the degree of change in the transmit out signal in response to the echo estimate signal being algebraically combined with the transmit in signal; generating an end path switch signal, said generating step including developing a Δĥ[n] vector representing the change in the estimated impulse response from one time period to the next and generating the end path switch signal to have a value in accordance with the strength of the directionality of change of the Δĥ[n] vector; sensing the values of the change enhancement signal and end path switch signal; and controlling convergence of the adaptive filter in accordance with the sensed signal values, such that the adaptive filter is enabled to update the estimated impulse response and converge whenever the change enhancement signal value represents at least a selected degree of change in the transmit out signal, irrespective of the value of the end path switch signal, and such that the adaptive filter is inhibited from updating the estimated impulse response when the change enhancement signal value represents less than the selected degree of change in the transmit out signal and the end path switch signal has a value less than a predetermined value.

45. A method as in claim 44, wherein said controlling step also enables the adaptive filter to update the estimated impulse response when the change enhancement signal value represents less than the selected degree of change in the transmit out signal and the end path switch signal value is greater than the predetermined value.

46. A method of controlling convergence of an adaptive filter, wherein the adaptive filter is for being coupled to transmit and receive paths for separating the transmit path into transmit in and transmit out paths, for developing and periodically updating an adjustable estimated impulse response ĥ[n] of an end path and for generating, in accordance with the estimated impulse response and a receive path signal, an estimate of an echo signal occurring on the transmit in path in response to the receive path signal, which echo estimate is algebraically combined with a transmit in path signal to yield a transmit out path signal, wherein the transmit in path signal at least occasionally includes output signals from the end path, said method comprising the steps of generating a change enhancement signal having a value representative of the degree of change in the transmit out signal in response to the echo estimate signal being algebraically combined with the transmit in signal; detecting whether the adaptive filter is in a converged state, such that the estimated impulse response is a good estimate of the actual impulse response of the end path, or if the adaptive filter is in an unconverged state, such that the estimated impulse response is not a good estimate of the actual impulse response, said detecting step including developing a Δh[n] vector representing the change in the estimated impulse response from one time period to the next, generating a signal having a value in accordance with the strength of the directionality of change of the Δh[n] vector and comparing the signal value with a threshold value to detect whether the adaptive filter is in a converged or an unconverged state; sensing the change enhancement signal value and the detected state of convergence of the adaptive filter; and controlling updating of the estimated impulse response and convergence of the adaptive filter in accordance with the sensed value of the change enhancement signal and the detected state of convergence of the adaptive filter.

47. A method as in claim 46, wherein said controlling step is responsive to a change enhancement signal value representing at least a selected degree of change in the transmit out signal to enable the adaptive filter to update the estimated impulse response and converge, irrespective of the detected state of convergence of the adaptive filter.

48. A method as in claim 46, wherein said controlling step is responsive to a change enhancement signal value representing less than a selected degree of change in the transmit out signal and a detected unconverged state of the adaptive filter to enable the adaptive filter to update the estimated impulse and converge.

49. A method as in claim 46, wherein said controlling step is responsive to a change enhancement signal value representing less than a selected degree of change in the transmit out signal and a detected converged state of the adaptive filter to inhibit the adaptive filter from updating the estimated impulse response.

50. A method as in claim 46, wherein said controlling step is responsive to either a change enhancement signal value representing less than a selected degree of change in the transmit out signal and a detected unconverged state of the adaptive filter, or to a change enhancement signal value representing at least the selected degree of change in the transmit out signal, to enable the adaptive filter to update the estimated impulse response and converge, and is responsive to a change enhancement signal value representing less than the selected degree of change in the transmit out signal and a detected converged state of the adaptive filter to inhibit the adaptive filter from updating the estimated impulse response, whereby said controlling step allows the adaptive filter to update the estimated impulse response when no end path output signals are present on the transmit in path and when an unconverged state of the adaptive filter is detected, and prevents the adaptive filter from updating the estimated impulse response when end path output signals are presented on the transmit in path, so that the adaptive filter is not diverged by end path output signals.

51. A method as in claim 46, wherein said step of detecting the state of convergence of the adaptive filter includes the step of sensing the change and direction of change, averaged over time, of the estimated impulse response.

52. A method of controlling convegence of an echo canceller, wherein the echo canceller is adapted to be coupled with transmit and receive paths of a telephone network for separating the transmit path into transmit in and transmit out paths, for developing and periodically updating an adjustable estimated impulse response $\hat{h}[n]$ of an end path, for generating, through a process including convolution of the estimated impulse response and a receive path signal from a far end of the network, an estimate of an echo signal occurring on the transmit in path in response to the receive path signal, and for subtracting the echo estimate signal from a transmit in path signal to yield a transmit out path signal, wherein the transmit in path signal at least occasionally includes signals originated at a near end of the network, said method comprising the steps of generating a change enhancement signal having a value representative of the degree of change in the transmit out signal in response to the echo estimate signal being subtracted from the transmit in signal; comparing the change enhancement signal value with a selected threshold value; detecting whether the echo canceller is in a converged state, such that the estimated impulse response is a good estimate of the actual impulse response of the end path, or whether it is in an unconverged state, such that the estimated impulse response is a poor estimate of the actual impulse response, said detecting step including developing a $\Delta\hat{h}[n]$ vector representing the change in the estimated impulse response from one time period to the next, generating a signal having a value in accordance with the strength of the directionality of change of the $\Delta\hat{h}[n]$ vector and comparing the signal value with a threshold value to detect whether the adaptive filter is in a converged or unconverged state; and controlling updating of the estimated impulse response and convergence of the echo canceller in accordance with the change enhancement signal value and the detected state of convergence of the echo canceller.

* * * * *